(12) United States Patent
Ytzhaik

(10) Patent No.: US 12,544,562 B2
(45) Date of Patent: Feb. 10, 2026

(54) FLEXIBLE AND STRETCHABLE WEARABLE DEFIBRILLATOR PATCH

(71) Applicant: NewPace Ltd., Caesarea (IL)

(72) Inventor: Moshe Ytzhaik, Caesarea (IL)

(73) Assignee: NewPace Ltd., Caesarea (IL)

( * ) Notice: Subject to any disclaimer, the term of this patent is extended or adjusted under 35 U.S.C. 154(b) by 0 days.

(21) Appl. No.: 18/852,639

(22) PCT Filed: Apr. 3, 2023

(86) PCT No.: PCT/IB2023/053364
§ 371 (c)(1),
(2) Date: Sep. 30, 2024

(87) PCT Pub. No.: WO2023/194881
PCT Pub. Date: Oct. 12, 2023

(65) Prior Publication Data
US 2025/0099747 A1    Mar. 27, 2025

Related U.S. Application Data

(60) Provisional application No. 63/326,863, filed on Apr. 3, 2022.

(51) Int. Cl.
*A61N 1/04* (2006.01)
(52) U.S. Cl.
CPC ........... *A61N 1/0496* (2013.01); *A61N 1/046* (2013.01)
(58) Field of Classification Search
CPC ............................ A61N 1/0496; A61N 1/046
See application file for complete search history.

(56) References Cited

U.S. PATENT DOCUMENTS

| | | | |
|---|---|---|---|
| 4,362,165 A | 12/1982 | Carmon et al. | |
| 4,979,517 A | 12/1990 | Grossman et al. | |
| 6,178,357 B1 | 1/2001 | Gliner et al. | |
| 6,336,047 B1 | 1/2002 | Thu et al. | |
| 2001/0051821 A1 | 12/2001 | Snyder | |
| 2004/0199237 A1 | 10/2004 | Mills et al. | |
| 2019/0022400 A1* | 1/2019 | Kumar | A61N 1/046 |

OTHER PUBLICATIONS

International Search Report in related PCT application PCT/IB2023/053364, dated Jul. 28, 2023.
Written Opinion in related PCT application PCT/IB2023/053364, dated Jul. 28, 2023.

* cited by examiner

*Primary Examiner* — Linda C Dvorak
*Assistant Examiner* — Abigail Bock
(74) *Attorney, Agent, or Firm* — Nathan & Associates Patent Agents Ltd.; Menachem Nathan

(57) ABSTRACT

A wearable AED patch for wearing by a subject, including: a flexible, stretchable outer ring that is adhered to the subject; a rigid or semi-rigid conductive portion partially separated from the outer ring by an air gap; and a flexible portion that extends over the outer ring and the air gap, and into the conductive portion such that the flexible portion and air gap enable the rigid or semi-rigid conductive portion to remain in conductive contact with the skin while the flexible, stretchable outer ring as well as the flexible stretchable portion contract and stretch as needed due to body movements and related skin movements.

12 Claims, 7 Drawing Sheets

FLEXIBLE AND STRETCHABLE WEARABLE DEFIBRILLATOR PATCH

CROSS REFERENCE TO RELATED APPLICATIONS

This is a 371 application from international patent application PCT/IB2023/053364 filed Apr. 3, 2023, which is related to and claims priority from U.S. provisional patent application No. 63/326,863 filed Apr. 3, 2022, which is incorporated herein by reference in its entirety.

FIELD

Embodiments disclosed herein relate to medical patches for use with defibrillation devices.

BACKGROUND

Medical patches may be used for various applications and in conjunction with appropriate devices. Examples of medical patches include electrocardiogram (ECG) patches, glucose monitoring patches, and patches used with cardiac monitoring devices and automated cardiac defibrillators. Such patches may in many cases include an inner active area and an outer adhesive zone. Most patches may be used for a limited time period, and have a limited surface area.

In the case of Automated Electrical Defibrillators (AED), short-term disposable patches may be connected to a patient's chest for both of detecting/sensing the ECG signal of the patient as well as for delivering a high voltage shock if a life-threatening arrhythmia was detected by the AED. The usage of the short-term patches is temporary and since the patient may be unconscious and supine, the adhesive area of the patches is used only to keep the patches in place for the relatively short period of detection and shock, in most cases for few minutes.

Patches for wearable AEDs, herein referred to as "long-term patches", or "wearable patches" may be required to remain on the patient's skin for much longer periods (usually for days or weeks), and require a degree of flexibility as the patient is moving and performing daily activities including bathing. During the period when adhered to the patient, wearable patches should not lose performance and the capabilities for sensing ECG and/or delivering a shock when required.

A typical structure of a wearable patch 100 known in the art that may be used for ECG/defibrillation is shown in FIG. 1. A conductive surface 102 in the middle of the patch may be fully or partially surrounded by a skin adhesive layer 104. Conductive surface 102 may include a conductive hydrogel material positioned between the skin of the patient and the active section of the patch. A conducting wire 106 may connect the conductive surface to the wearable AED. Skin adhesive layer 104 may include laminated layers or any other skin adhesive material that bonds with the skin in order to hold the wearable patch in place and prevent it from peeling. Long term defibrillator patches are generally required by standards to be not less than a minimum size of a defibrillation area, which is 50 cm².

The conductive surface must be in full contact with the skin of the patient (via the conductive hydrogel layer) in order to verify the efficiency and efficacy of the delivered shock. Long-term patches are generally adhered to a patient's upper chest and abdominal area where, during daily routine motion, the skin of the patient may stretch and contract on a regular basis. Therefore, the patch structure needs to compensate for this stretching in order to ensure the conductive surface remains in contact with the skin.

In a typical wearable patch, the adhesive layer (whether it is laminated from several layers or formed of a single layer) is generally flexible and stretchable. By contrast, the conductive layer may be semi-rigid (somewhat flexible but not stretchable) and skin movement may eventually cause the difference in flexibility of the adhesive and conductive parts to result in peeling away of the adhesive layer from the skin of the patient resulting in detachment of the conductive area from the skin. Alternatively or additionally, the difference in movement of the adhesive and conductive layers relative to the skin may cause discomfort to the patient such that the patient peels away, moves, or removes the wearable patch. In either case the patch may be rendered less shock-efficient, or (if removed) completely ineffective.

Thus, in AED patches as known, the adhesive layer is continually pressed on by semi-rigid conductive layers and during long wear periods, these force moments are accumulated, causing the adhesive to start peeling from the body or causing discomfort for the patient, ultimately resulting in reduced contact between the conductive layer and the skin, thus potentially rendering the patch ineffective.

There is therefore a need for, and it would be advantageous to have a wearable AED patch which may adhere to the body for a period of up to 30 days while enabling the patient to comfortably continue with a regular daily routine including moving, bathing, sitting, lying down, and so forth.

SUMMARY

Exemplary embodiments disclosed herein relate to wearable AED patches that include a flexible portion covering an air gap that provides separation between, and enables relatively independent movement of an adhesive layer adhered to the skin of the patient and a conductive layer that remains in conductive contact with the skin of the patient. The combined flexible portion and air gap thus may compensate for body movements (functioning as a "moment absorber") while keeping the patch effectively conductive.

Consistent with disclosed embodiments, a wearable AED patch for wearing by a subject may include: a flexible outer ring that is configured to be adhered to skin of the subject; a rigid or semi-rigid conductive portion partially separated from the outer ring by an air gap; and a flexible portion that extends over the air gap, at least partially over the outer ring, and into or over the conductive portion.

In some embodiments, the flexible outer ring includes an adhesive ring and a barrier ring, the conductive portion includes a conductive interface and a conductive layer, and an inner diameter of the adhesive ring and a barrier ring is larger than an outer diameter of the conductive interface and conductive layer thereby forming the air gap.

In some embodiments, a shape cover layer extends at least partially over the outer ring, over the air gap, and over the conductive portion and is adhered to the barrier ring and to the conductive layer. In some embodiments, a patch cover layer extends over the shape cover layer such that the shape cover layer and patch cover layer both extend over the air gap to form the flexible portion.

In some embodiments, the patch and shape cover layers have substantially the same diameter. In some embodiments, a semi-rigid isolated stiffener layer is positioned between the patch cover layer and shape cover layer over the conductive layer and has substantially the same diameter as the conductive layer.

In some embodiments, the conductive layer is printed onto a substrate layer positioned between the conductive layer and the shape cover layer, and wherein the substrate layer has substantially the same diameter as the conductive layer. In some embodiments, the conductive layer is printed onto the shape cover layer.

In some embodiments, the wearable AED patch further includes an electrical wire positioned between the shape and patch cover layers and connected to an electrical crimp washer that extends through the shape cover layer and conductive layer before terminating in a conductive eyelet that is in electrical contact with the conductive layer, wherein the electrical wire extends out of the wearable patch and is configured to be connected to an AED to thereby provide electrical communication between the AED and the conductive layer.

In some embodiments, the flexible outer ring includes an adhesive ring having adhesive configured to adhere to human skin. In some embodiments, the air gap has a width of between 0.1 mm-20 mm.

In some embodiments, the conductive portion includes a conductive interface and a conductive layer, wherein the conductive interface is positioned between the conductive layer and the skin. In some embodiments, the conductive interface includes a conductive hydrogel material. In some embodiments, the wearable patch has a defibrillation area of at least 50 cm2 or the minimum area according the applicable standards.

In some embodiments, the flexible portion and air gap enable the rigid or semi-rigid conductive portion to remain in conductive contact with the skin while the flexible outer ring as well as the flexible portion flex and stretch as needed due to body movements and related skin movements of the subject.

As used herein, the term "patch" may describes an AED patch incorporating one or both of a sensing electrode and a defibrillation electrode. The terms "patient" and "subject" may be used herein interchangeably.

As used herein, in some embodiments, flexible materials may have a Young's modulus of between 0.01-1.5 GPa, semi-rigid materials may have a Young's modulus of between 1.5-3 and rigid materials may have a Young's modulus greater than 3. "Long-term" as used herein refers to a period of 5-30 days.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Aspects, embodiments and features disclosed herein will become apparent from the following detailed description when considered in conjunction with the accompanying drawings. Like elements may be marked with like numerals in different figures, where.

DETAILED DESCRIPTION

Figure 1:
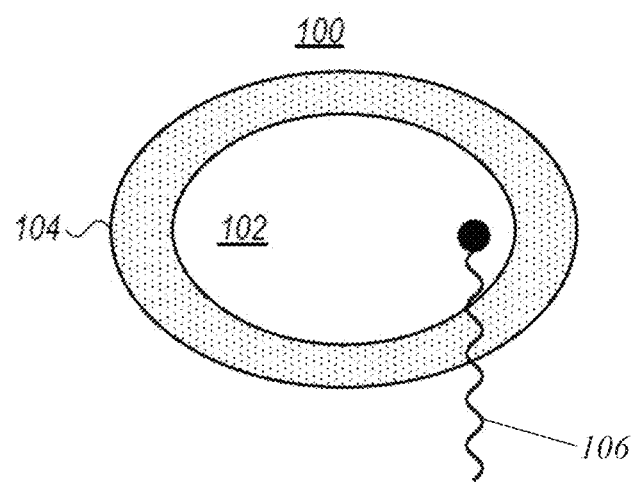
FIG. 1 is a drawing of a medical patch as known in the art.
Figure 2A:
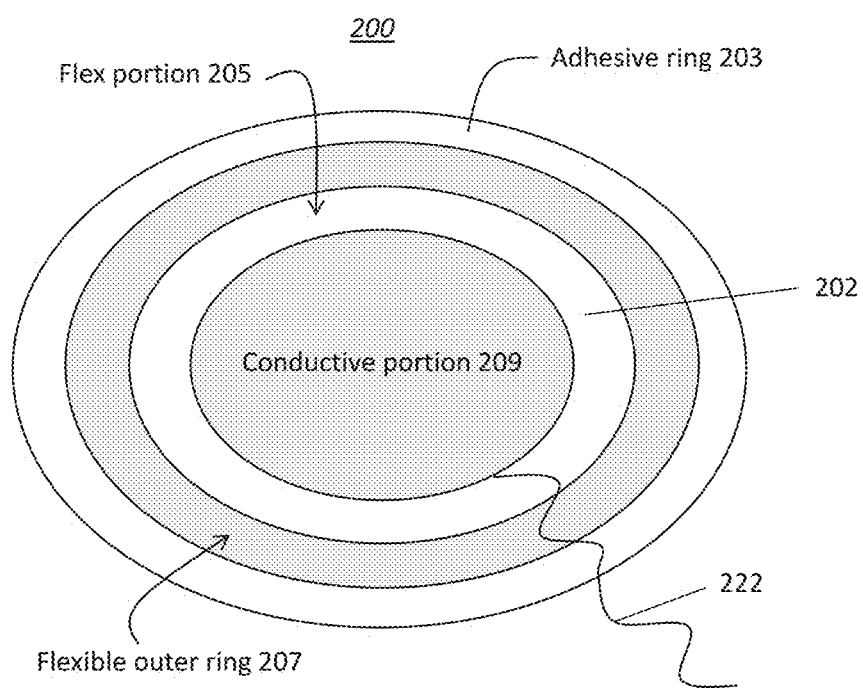
FIG. 2A is a drawing showing a plan view of a wearable patch according to some implementations.
Figure 2B:
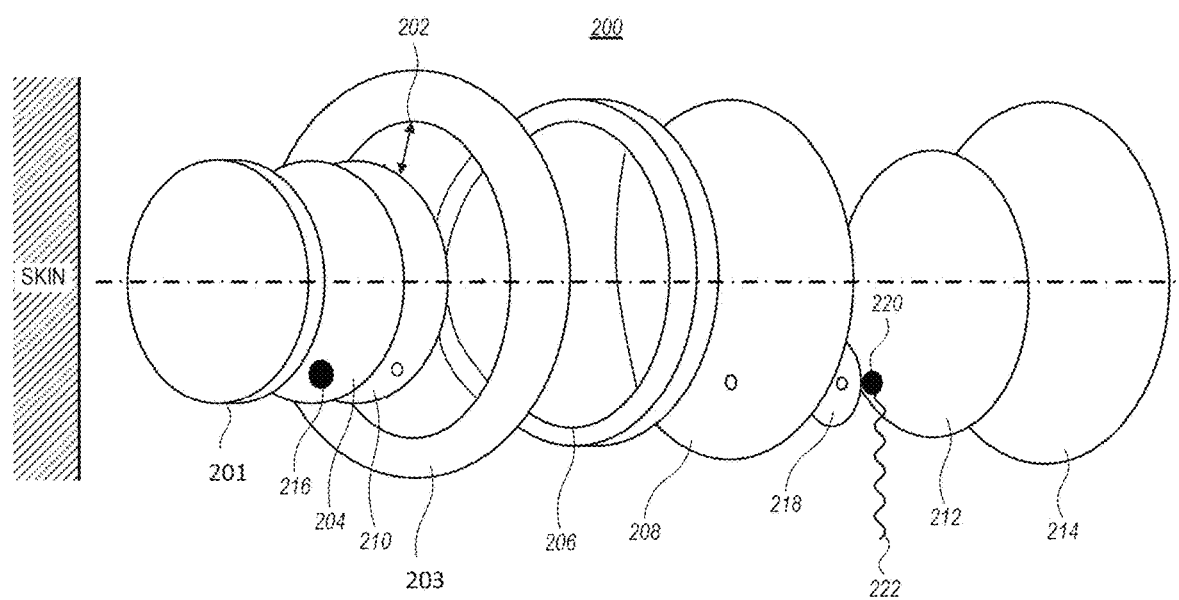
FIG. 2B is a drawing showing a perspective exploded view of a wearable patch according to some implementations.
Figure 2C:
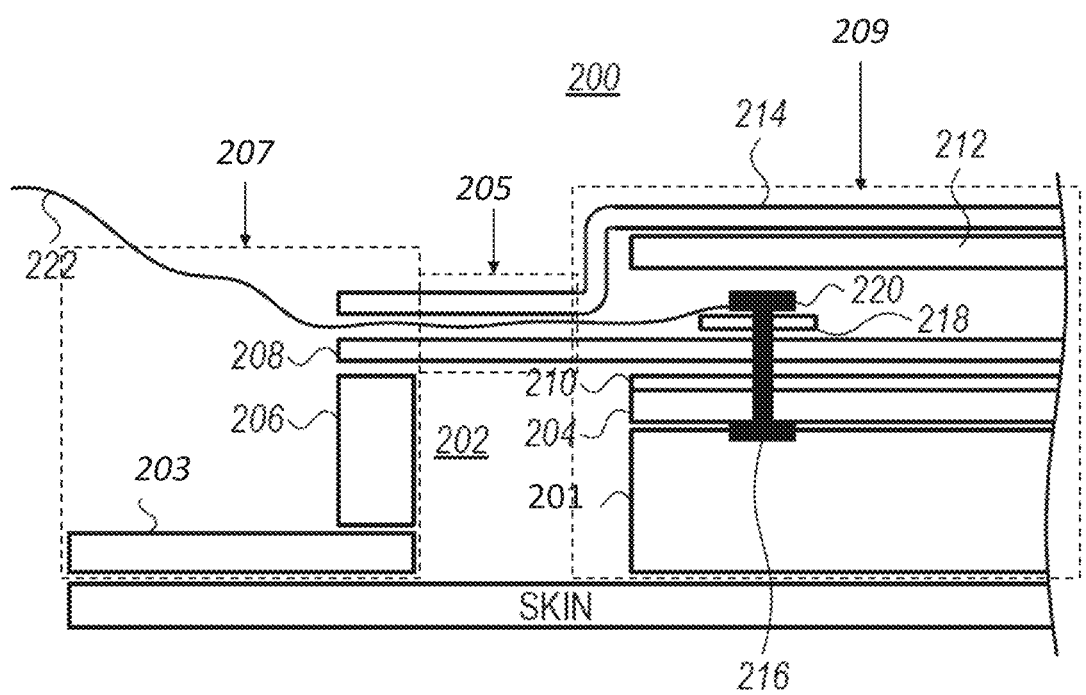
FIG. 2C is a drawing showing a cross-sectional view of a wearable patch according to some implementations.
Figure 2D:
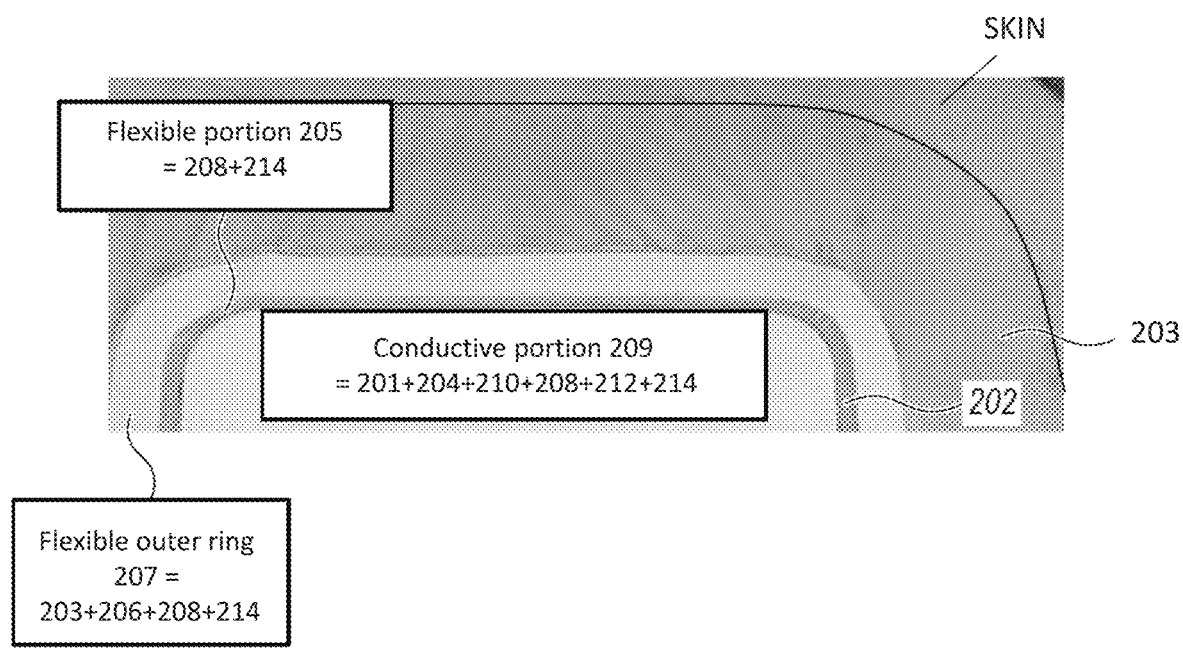
FIG. 2D is a photograph showing a portion of a wearable patch adhered to a patient according to some implementations.
Figure 3A:
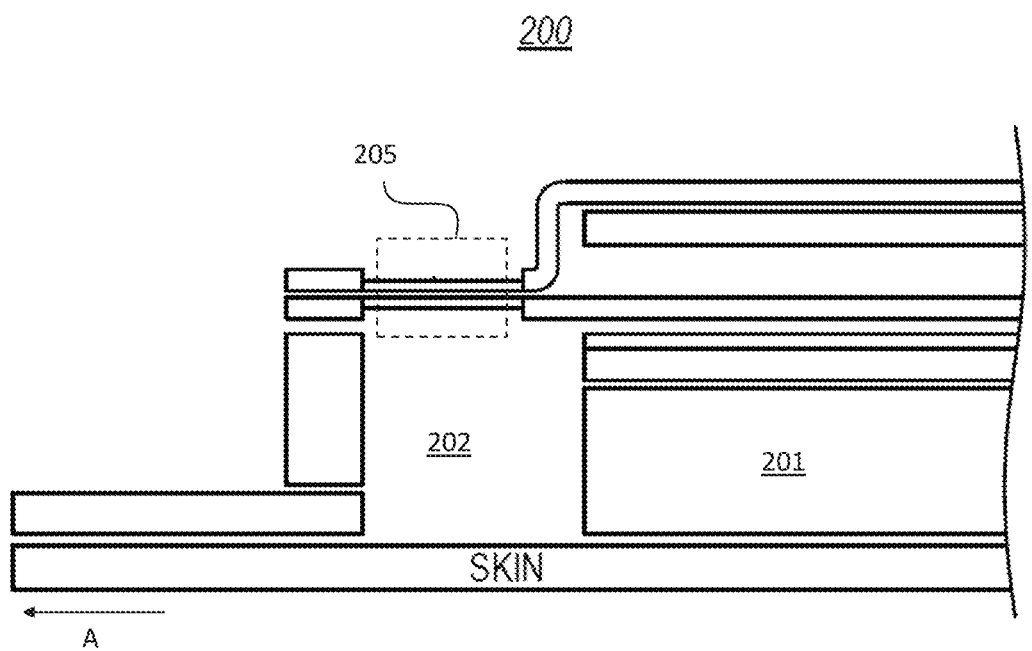
FIG. 3A is a drawing showing a cross-sectional view of a wearable patch in a non-contracted state according to some implementations.
Figure 3B:
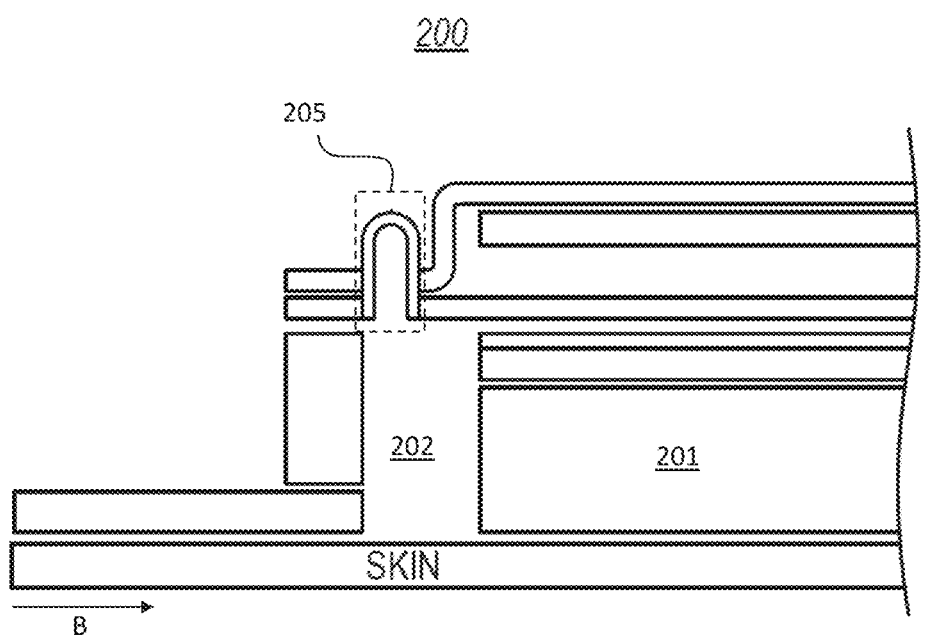
FIG. 3B is a drawing showing a cross-sectional view of a wearable patch in a contracted state according to some implementations.

Exemplary embodiments disclosed herein relate to a wearable patch for use with an AED. FIGS. 2A-2D and 3A-3B are illustrations of a wearable AED patch 200 according to some implementations. FIG. 2A is a drawing showing a plan view of wearable patch 200. FIG. 2B is a drawing showing a perspective exploded view of wearable patch 200. FIG. 2C is a drawing showing a cross-sectional view of wearable patch 200. FIG. 2D is a photograph showing a portion of wearable patch 200 adhered to a patient. FIG. 3A is a drawing showing a cross-sectional view of wearable patch 200 in a non-contracted state and FIG. 3B is a drawing showing a cross-sectional view of wearable patch 200 in a contracted state.

Patch 200 is depicted as having a round shape, but it should be appreciated that patch 200 may have other shapes such as a rectangular shape, depending on the use case. In some embodiments, wearable patch 200 may have a defibrillation area of at least 50 $cm^2$. In some embodiments, wearable patch 200 may have a minimum defibrillation area according to applicable standards.

As shown, wearable patch 200 (or simply "patch 200" herein) may include a flexible, stretchable adhesive ring 203 that is also part of a flexible, stretchable outer ring 207, a flexible portion 205 that covers an air gap 202, and a rigid or semi-rigid conductive portion 209. As used herein the term flexible may be understood to include stretchable as well. In some embodiments, flexible portion 205 may cover air gap 202. Advantageously, flexible portion 205 and air gap 202 enable the rigid or semi-rigid conductive portion 209 to remain in conductive contact with the skin while the flexible, stretchable adhesive ring 203 and outer ring 207 as well as flexible portion 205 flex and stretch as needed due to body movements and related skin movements. As shown in the figures, wearable patch 200 may include layers and components as described below, some of which extend between stretchable outer ring 207 and/or flexible portion 205 and/or conductive portion 209.

A conductive interface 201 may include a conductive hydrogel material and is positioned between the skin of the patient and an electrical conductive layer 204 of patch 200. Voltages applied or sensed at conductive layer 204 may be conducted through conductive interface 201 to the skin.

Electrical conductive layer 204 (or simply "conductive layer" herein) may be formed of a conductive material or substrate including but not limited to Ag, Ag—Ag/Cl, stainless steel, aluminum, a semi-rigid printed circuit board (PCB), a flexible PCB, or any other conductive material. In some embodiments, electrical conductive layer 204 may have substantially the same dimensions (such as diameter) as conductive interface 201. In some embodiments, electrical conductive layer 204 may be flexible or semi-rigid.

Adhesive ring 203 may be configured to adhere to the human body (i.e. to "skin", as shown in the figures). In some embodiments, adhesive ring 203 may be formed from laminated layers or any other skin adhesive material. In some embodiments, adhesive ring 203 may create a bond with the skin in order to hold the patch in place and prevent adhesive ring 203 from peeling. In some embodiments, as shown, adhesive ring 203 may have a larger outer diameter than outer ring 207.

A barrier ring 206 may be positioned and adhered between adhesive layer 203 and a shape cover layer 208. In some embodiments, barrier ring 206 may be formed from foam or another suitably flexible material. The combined height above the skin of barrier ring 206 and adhesive ring 203 may be substantially the same as the height above the skin of conductive interface 201 and electrical conductive layer 204. Barrier ring 206 may thus add height to outer ring 207.

In some embodiments, the size of the inner diameter of adhesive ring 203 and barrier ring 206 is 0.1-40 mm wider than an outer diameter of conductive interface 201 and electrical conductive layer 204. This difference in diameter creates air gap 202 between the outer diameter of conductive interface 201/electrical conductive layer 204 and the inner diameter of adhesive ring 203/barrier ring 206. In some embodiments the air gap 202 has a width of between 0.1 mm-40 mm between the inner diameter of adhesive ring 203 and barrier ring 206 and the outer diameter of conductive interface 201 and electrical conductive layer 204. In use, air gap 202 along with flexible portion 205 may compensate for the stretch and contractions of the subject's skin during a daily routine of patch wearing while ensuring that conductive portion 209 remains in effective contact with the skin.

In some embodiments, shape cover layer 208 may be formed from flexible or semi flexible or stretchable material. In some embodiments, shape cover layer 208 may be laminated to barrier ring 206 creating a structure in the shape of the wearable patch. In some embodiments, shape cover layer 208 may have a thickness dictated by the patch design. In some embodiments, an outer diameter of shape cover layer 208 may be substantially the same as an outer diameter of barrier ring 206.

Conductive layer 204 may be printed onto a substrate layer 210. In some embodiments, substrate layer 210 may have substantially the same dimensions as conductive layer 204. In some embodiments, substrate layer 210 may be flexible or semi-flexible to accommodate the shape of a human body part to which wearable patch 200 is adhered. In some embodiments, shape cover layer 208 may be laminated to substrate layer 210 so as to hold substrate layer 210 in position. In some embodiments, conductive layer 204 may be printed directly onto shape cover layer 208, and substrate layer 210 may not be required.

In some embodiments, an isolated stiffener layer 212 may be formed of a semi-rigid material such as PET or vinyl. In some embodiments, isolated stiffener layer 212, together with substrate layer 210, ensures sufficient contact of conductive interface 201 to the human body (skin). In some embodiments, the combined thickness of substrate layer 210 and an isolated stiffener layer 212 (described further below) may be 50 µm-400 µm. It should be appreciated that conductive layer 204 (with or without substrate layer 210) may not be sufficiently rigid and isolated stiffener layer 212 provides added stiffness/rigidity to conductive portion 209 to press conductive layer 204 and thus conductive interface 201 onto the skin. Without isolated stiffener layer 212, conductive layer 204 and/or substrate layer 210 might contract which would cause a disconnection between conductive interface 201 and the patient's skin.

Patch 200 may be electrically connected to an AED (not shown) using electrical connection components. The AED may be connected to an electrical wire 222. Electrical wire 222 may be connected to an electrical crimp washer 220 that extends through a metal washer 218, shape cover layer 208, substrate layer 210, and conductive layer 204, before terminating in a conductive eyelet 216 that is in electrical contact with conductive layer 204. In some embodiments, metal washer 218 may prevent conductive layer 204 from bending during the crimping process when crimp washer 220 is crimped into position.

In some embodiments, a patch cover layer 214 may seal patch 200 by being adhered to shape cover layer 208 and isolated stiffener layer 212 over conductive portion 209, and to extend over shape cover layer 208 and over air gap 202 to create flexible portion 205. In some embodiments, an outer diameter of patch cover layer 214 may be substantially the same as an outer diameter of barrier ring 206. In some embodiments, patch cover layer 214 may be water resistant or water proof, or non-water resistant according to the required design. In some embodiments, patch cover layer 214 may be made of a flexible material such as thermoplastic polyurethane (TPU). Patch cover layer 214 may include adhesive to be adhered to and hold in position within patch 200 isolated stiffener layer 212 as well as electrical connection components 216, 218, 220, and 222.

FIG. 2D shows adhesive ring 203 and air gap 202 as well as the different layers and components that form part of flexible portion 205, outer ring 207, and conductive portion 209. As shown, flexible portion 205 may include layers/components 208+214, outer ring 207 may include layers/components 203+206+208+214, and conductive portion 209 may include layers/components 201+204+210+208+212+214.

FIG. 3A shows AED patch 200 with flexible portion 205 in a stretched state (and air gap 202 uncompressed) such as when the skin and adhered adhesive ring 203 move in a direction shown by arrow "A" while conductive interface 201 remains in contact with the skin. FIG. 3B shows AED patch 200 with flexible portion 205 in a contracted state (and air gap 202 compressed) such as when the skin and adhered adhesive ring 203 move in a direction shown by arrow "B" while conductive interface 201 remains in contact with the skin. It should be appreciated that skin movement results in contraction and expansion of flexible portion 205 over air gap 202 while conductive interface 201 remains in contact with the skin.

Unless otherwise defined, all technical and scientific terms used herein have the same meaning as commonly understood by one of ordinary skill in the art. The materials, methods, and examples provided herein are illustrative only and not intended to be limiting.

In the claims or specification of the present application, unless otherwise stated, adjectives such as "substantially" and "about" modifying a condition or relationship characteristic of a feature or features of an embodiment, are understood to mean that the condition or characteristic is defined to within tolerances that are acceptable for operation of the embodiment for an application for which it is intended.

It should be understood that where the claims or specification refer to "a" or "an" element, such reference is not to be construed as there being only one of that element.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

While this disclosure describes a limited number of embodiments, it will be appreciated that many variations, modifications and other applications of such embodiments may be made. The disclosure is to be understood as not limited by the specific embodiments described herein, but only by the scope of the appended claims.

What is claimed is:

1. A wearable AED patch for wearing by a subject, comprising:
   a flexible outer ring that is configured to be adhered to skin of the subject;
   a rigid or semi-rigid conductive portion partially separated from the outer ring by an air gap, wherein the flexible outer ring includes an adhesive ring and a barrier ring, wherein the conductive portion includes a conductive interface and a conductive layer, and wherein an inner diameter of the adhesive ring and the barrier ring is larger than an outer diameter of the conductive interface and conductive layer thereby forming the air gap; and
   a flexible portion that extends over the air gap, at least partially over the outer ring, and into the conductive portion; and
   a shape cover layer that extends at least partially over the outer ring, over th de air gap, and over the conductive portion and is adhered to the barrier ring and to the conductive layer; and
   a patch cover layer that extends over the shape cover layer such that the shape cover layer and patch cover layer both extend over the air gap to form the flexible portion.

2. The wearable AED patch of claim 1, wherein the patch and shape cover layers have substantially the same diameter.

3. The wearable AED patch of claim 2, wherein a semi-rigid isolated stiffener layer is positioned between the patch cover layer and shape cover layer over the conductive layer and has substantially the same diameter as the conductive layer.

4. The wearable AED patch of claim 1, wherein the conductive layer is printed onto a substrate layer positioned between the conductive layer and the shape cover layer, and wherein the substrate layer has substantially the same diameter as the conductive layer.

5. The wearable AED patch of claim 1, wherein the conductive layer is printed onto the shape cover layer.

6. The wearable AED patch of claim 1, further including an electrical wire positioned between the shape and patch cover layers and connected to an electrical crimp washer that extends through the shape cover layer and conductive layer before terminating in a conductive eyelet that is in electrical contact with the conductive layer, wherein the electrical wire extends out of the wearable patch and is configured to be connected to an AED to thereby provide electrical communication between the AED and the conductive layer.

7. The wearable AED patch of claim 1, wherein the flexible outer ring includes an adhesive ring having adhesive configured to adhere to human skin.

8. The wearable AED patch of claim 1, wherein the air gap has a width of between 0.1 mm-20 mm.

9. The wearable AED patch of claim 1, wherein the conductive portion includes a conductive interface and a conductive layer, wherein the conductive interface is positioned between the conductive layer and the skin.

10. The wearable AED patch of claim 9, wherein the conductive interface includes a conductive hydrogel material.

11. The wearable AED patch of claim 1, wherein the wearable patch has a defibrillation area of at least 50 $cm^2$ or the minimum area according the applicable standards.

12. The wearable AED patch of claim 1, wherein the flexible portion and air gap enable the rigid or semi-rigid conductive portion to remain in conductive contact with the skin while the flexible outer ring as well as the flexible portion flex and stretch as needed due to body movements and related skin movements of the subject.

* * * * *